Patented Apr. 9, 1946

2,398,080

UNITED STATES PATENT OFFICE 2,398,080

PROCESS OF NITRATING AMINES

George V. Caesar, Staten Island, and Max Goldfrank, New York, N. Y., assignors to Stein, Hall & Company, Inc., New York, N. Y., a corporation of New York No Drawing. Application January 13, 1944,
Serial No. 518,126

13 Claims. (Cl. 260—248)

The present invention relates to a new process for the direct liquid phase nitration of hexamethylenetetramine.

In accordance with the prior art it has been proposed to add the hexamethylenetetramine slowly, in small portions at a time, to nitric acid at a temperature of 20 to 30° C. When all was in solution the liquid was warmed to about 55° C. and allowed to stand for a few minutes and then cooled to 20° C. The nitrated product was then precipitated by the addition of water. This nitration with nitric acid was further studied by Hale who added 50 grams of hexamethylenetetramine during fifteen minutes to 500 grams of 100% nitric acid while the temperature was not allowed to rise about 30° C. The mixture was then cooled to 0°, held there for twenty minutes and drowned. The best yield obtained was 68% which is relatively low.

In this prior art nitration of hexamethylenetetramine with nitric acid, the by-products appear to be formaldehyde ($CH_2O$) and ammonia ($NH_3$) and the reaction appears to be as follows:

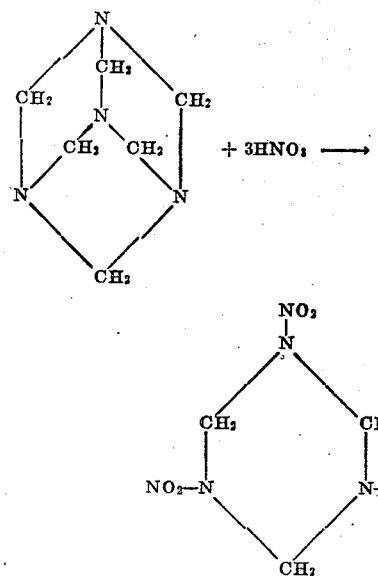

The nitrated product apparently is soluble in the concentrated nitric acid and is separated only by diluting the acid with water. This is an undesirable aspect of the prior art process if the acid is to be recovered for reuse. Especially is this so considering the very large stoichiometric excess of nitric acid used by the prior art process. The formaldehyde which is liberated remains in the spent nitric acid and interferes with the recovery of nitric acid from it. Furthermore, the formaldehyde tends to be oxidized by the nitric acid and yields a variety of products which interfere with the reuse of the nitric acid. The ammonia produced also reacts with the nitric acid to form ammonium nitrate which dilutes the nitrating power of acid and the amount available for recovery and reuse as such.

In accordance with the invention, hexamethylenetetramine is nitrated by means of nitrogen pentoxide in solution in an inert non-aqueous solvent, such as a hydrocarbon or a chlorinated hydrocarbon.

The ultimate products of the reaction of hexamethylenetetramine and nitrogen pentoxide are believed to be formaldehyde and lower oxides of nitrogen and it is thought that the reaction may proceed as follows:

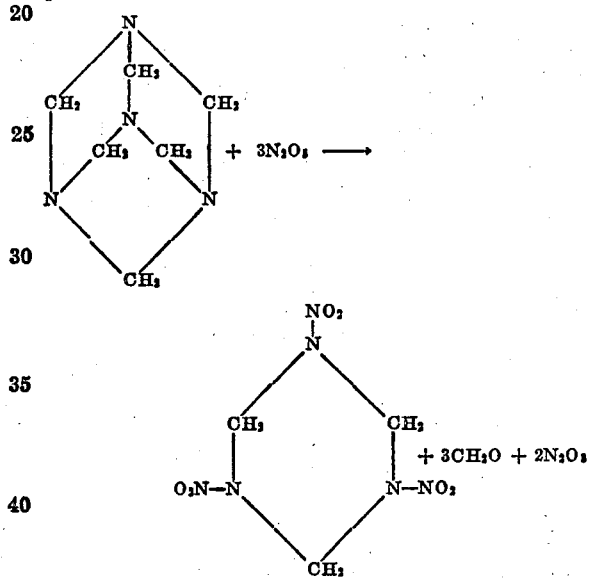

The formaldehyde appears to be insoluble in the solvent and, therefore, the nitrating solution remains uncontaminated and can be reused. Because ammonia is not produced as a by-product, there is no reduction in the nitrating power of the solution due to reaction with the by-products. In addition, it is possible to obtain higher yields in accordance with our invention than in the prior art processes of utilizing nitric acid.

As illustrative of one of the preferred forms of practicing the invention, 1 gram of hexamethylenetetramine is dissolved in 10 cc. of chloroform (CHCl₃) and this solution is added slowly, with agitation, to 100 cc. of chloroform containing 11.6 grams of nitrogen pentoxide dissolved therein. The temperature is maintained at about 20° C. for about 30 minutes. The crystalline cyclotrimethylenetrinitramine separates as a precipitate and is removed by filtration. The precipitate is washed with chloroform following which it is washed with water and dried at 65° C. The yield of the cyclotrimethylenetrinitramine is 1.4 grams or approximately 89%. The nitrating solution was uncontaminated and can be further used by the addition of hexamethylenetetramine and nitrogen pentoxide thereto. The process is applicable to a continuous method of nitration.

The portion of the hexamethylenetetramine not entering into the reaction is thought to remain in the solution, and upon reuse of the nitrating solution it will eventually be utilized. The invention contemplates, therefore, not only the high yields per pass, but substantially a 100% yield in a continuous process.

The nitrogen pentoxide need not necessarily be a chemically pure compound to be utilized in the process. However, if great purity in the final product is important, particularly for the manufacture of explosives, it is preferred to utilize ingredients which are as chemically pure as possible so as to avoid undesirable components entering into the reaction.

The process may be practiced in any manner in which the material to be nitrated is contacted with the nitrogen pentoxide in the solvent. This may be carried out in a batch operation, following which the nitrated product is separated. However, our process is well adapted to a continuous operation, and since continuous processes are so desirable for commercial operations, this may be a preferable commercial form. In one such continuous process the material to be nitrated may be continuously added to the nitrating solution in a reaction zone following which the mixture is transferred to a filtering zone and the nitrated product separated. The nitrating solution may be continuously or intermittently refortified with nitrogen pentoxide and again returned to the reaction zone to be reused.

In another process both the nitrogen pentoxide and the material to be nitrated may be continuously introduced into a mixer in the correct proportions. The nitrated product may be separated at the bottom as a precipitate.

In view of the above explanation, it is obvious that many ways of carrying out the nitration may be suggested to one skilled in the art, and all such variations are intended to be included in the scope of the present invention.

The neutral solvent which is utilized in accordance with the invention may be selected from many available non-aqueous solvents such as those of coal tar or petroleum origin. It is preferred to utilize a material which is not reactive with any of the other materials present, i. e., the nitrogen pentoxide, the material to be nitrated, the nitrated product and the by-products. It is preferred to utilize a solvent in which not only the nitrogen pentoxide is soluble but in which the material to be nitrated is soluble and the nitrated product is insoluble. However, both the material to be nitrated and the nitrated product may be soluble or insoluble. If the nitrated product is soluble it can be separated by evaporation of the solvent which can be recovered and reused. As specific examples, it has been found that chloroform, carbon tetrachloride and propylene dichloride may be used advantageously. Hydrocarbons in the same boiling range may be used. Generally it is advantageous to utilize as a solvent a material having the above properties and also having a boiling point or range which is sufficiently high so that it can be maintained readily in the liquid phase during the nitration but sufficiently low so that any solvent adhering to the nitrated product may be readily removed during drying at a temperature above the boiling point of the solvent but below the temperature at which the nitrated product would be harmed. Chloroform (CHCl₃) for example, is particularly advantageous in this connection because of its boiling at about 61.2° C. The foregoing solvents are mentioned merely by way of illustration and it is intended that the invention shall not be limited thereto. The solvents which may be utilized cover a broad class that are well known to those skilled in the art. In view of the present disclosure, those skilled in the art may readily select a solvent suitable for the particular conditions under which the process is to be carried out and the material to be nitrated.

The proportions of the reacting ingredients utilized may be varied over a wide range, depending upon the conditions of operation and the results which it is desired to obtain. The theoretical amounts of the reacting ingredients, of course, may be calculated from the formulas illustrating the reaction.

In general the amount of the nitrogen pentoxide may be varied by varying its concentration in the nitrating solution and also by varying the amount of nitrating solution used with the product to be nitrated. It has been found convenient to dissolve the nitrogen pentoxide in the proportion of about 5 to 50 grams per 100 cc. of solution, preferably the range is about 8 to 25 grams. Inasmuch as the degree of nitration appears to be dependent upon time as well as upon concentrations, the process proceeds quite well with any concentration above 8 grams of nitrogen pentoxide per 100 cc. of solution. As the nitration proceeds, additional nitrogen pentoxide may be added, if desired, to fortify and maintain the initial strength of the solution. Alternatively, a stronger solution may be used so that the concentration does not fall below the minimum figure which is preferred to be maintained during the entire course of the reaction.

The amount of the nitrating solution utilized in relation to the material to be nitrated may vary over a wide range, the minimum being sufficient to provide the desired amount of nitrogen pentoxide to accomplish the nitration. This will depend upon whether nitrogen pentoxide is to be added during the course of the reaction or whether the process contemplates the presence of a sufficient initial concentration to complete the reaction. In general there is no objection to a great excess of the nitrating solution to cause the reaction to proceed at the desired degree. When the process is carried out continuously on a large scale a great amount of solution may be used to fill a system or the apparatus. Any larger amount may be used and it will be apparent, in view of the disclosure, that the amount is not critical and may be varied throughout a wide range without affecting the economy of the process.

As a precautionary measure the temperature at which the process is carried out should not be too high. In general a temperature range of the order of −20° to 35° C. may be used, preferably 0° to 30° C. The temperature may be selected with reference to the products to be nitrated, the factors of safety, the rate of the reaction desired, etc.

In general it is not necessary to carry out the process under pressure. Because of the ease of operation in the absence of pressure, this is preferred. It is an advantage of the present process, however, that it may be carried out in a closed system, provided with suitable escapes for the gaseous products formed.

In view of the foregoing disclosure and many variations in carrying out the invention, it may be suggested to one skilled in the art that all such variations are intended to be included within the scope of the invention as fall within the following claims.

We claim:

1. A process of preparing nitramines which comprises reacting hexamethylenetetramine with nitrogen pentoxide as the primary nitrating agent in a liquid non-aqueous diluent under nitrating conditions to form a nitrated product.

2. A process of nitrating hexamethylenetetramine which comprises contacting it with a solution of nitrogen pentoxide dissolved in a non-aqueous liquid solvent under nitrating conditions to form a nitrated product.

3. A process of nitrating hexamethylenetetramine which comprises contacting it with nitrogen pentoxide dissolved in liquid chloroform to form a nitrated product.

4. A process of nitrating hexamethylenetetramine which comprises contacting it with a solution of nitrogen pentoxide dissolved in a non-aqueous solvent in the proportion of about 5 to 50 grams of nitrogen pentoxide to 100 cc. of solution, and maintaining a temperature of about −20 to 35° C. during the nitration to form a nitrated product.

5. A process of nitrating hexamethylenetetramine which comprises contacting it with a solution of nitrogen pentoxide dissolved in a non-aqueous solvent in the proportion of about 5 to 50 grams of nitrogen pentoxide to 100 cc. of solution, maintaining a temperature of about −20 to 35° C. during the nitration, and separating the nitrated product from the solution.

6. A process of nitrating hexamethylenetetramine which comprises contacting it with nitrogen pentoxide dissolved in liquid chloroform in the proportion of about 5 to 50 grams of nitrogen pentoxide to 100 cc. of solution to form a nitrated product.

7. A process of nitrating hexamethylenetetramine which comprises contacting it with nitrogen pentoxide dissolved in chloroform in the proportion of about 5 to 50 grams of nitrogen pentoxide to 100 cc. of solution, maintaining a temperature of about −20 to 35° C. during the nitration, and separating the nitrated product from the solution.

8. A process of nitrating hexamethylenetetramine which comprises dissolving it in chloroform and slowly adding the solution so formed with agitation to a solution of nitrogen pentoxide in chloroform, the amount of the nitrogen pentoxide being about 10% of the total amount of the chloroform, maintaining the temperature at about 20° C. for about 30 minutes, removing the crystalline cyclotrimethylenetrinitramine which forms as a precipitate, and washing and drying the precipitate.

9. A continuous process for manufacturing cyclotrimethylenetrinitramine, which comprises continuously contacting hexamethylenetetramine and nitrogen pentoxide under nitrating conditions in a liquid solvent in which both are soluble but in which the cyclotrimethylenetrinitramine is insoluble, and continuously separating the precipitated cyclotrimethylenetrinitramine.

10. A continuous process for manufacturing cyclotrimethylenetrinitramine which comprises continuously contacting hexamethylenetetramine and nitrogen pentoxide dissolved in liquid chloroform, and continuously separating the precipitated cyclotrimethylenetrinitramine.

11. A continuous process for manufacturing cyclotrimethylenetrinitramine which comprises continuously adding hexamethylenetetramine to a solution of nitrogen pentoxide under nitrating conditions in a non-aqueous liquid solvent in which the hexamethylenetetramine is soluble but in which the cyclotrimethylenetrinitramine is insoluble, and continuously separating the precipitated cyclotrimethylenetrinitramine.

12. A continuous process for manufacturing cyclotrimethylenetrinitramine which comprises continuously adding hexamethylenetetramine to a solution of nitrogen pentoxide in liquid chloroform, and continuously separating the precipitated cyclotrimethylenetrinitramine.

13. A continuous process for manufacturing cyclotrimethylenetrinitramine which comprises continuously mixing a solution of hexamethylenetetramine in chloroform with a solution of nitrogen pentoxide in chloroform, maintaining a nitrogen pentoxide concentration of at least 8 grams for 100 cc. of chloroform and a temperature of 0° to 30° C., and continuously separating the precipitated cyclotrimethylenetrinitramine.

GEORGE V. CAESAR.
MAX GOLDFRANK.